UNITED STATES PATENT OFFICE.

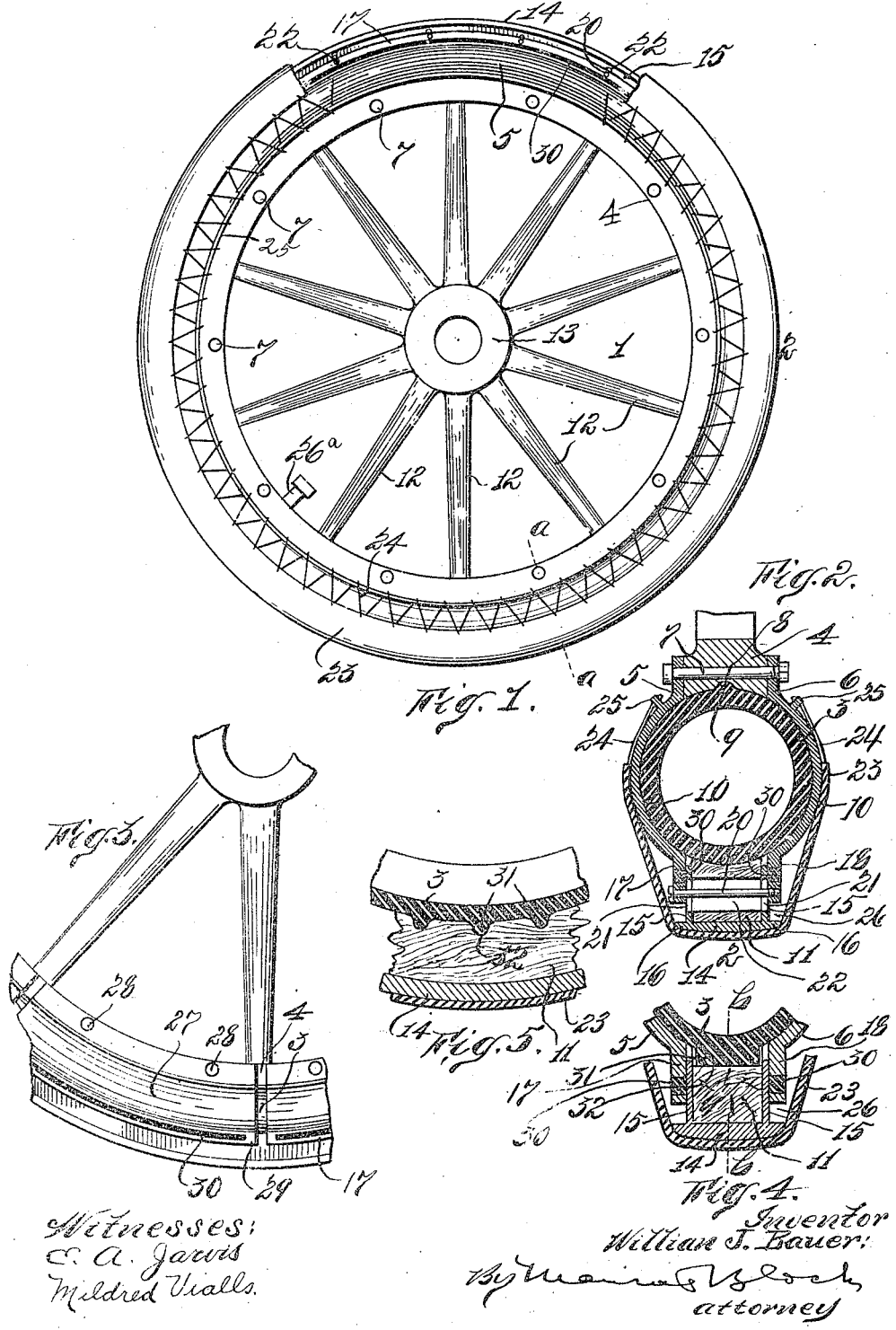

WILLIAM J. BAUER, OF NEW YORK, N. Y., ASSIGNOR TO BAUER NON-COLLAPSIBLE WHEEL COMPANY, OF NEW YORK, N. Y., A CORPORATION OF NEW YORK.

AUTOMOBILE-TIRE.

944,308.

Specification of Letters Patent. Patented Dec. 28, 1909.

Application filed August 28, 1908. Serial No. 450,697.

*To all whom it may concern:*

Be it known that I, WILLIAM J. BAUER, a citizen of the United States, residing at New York city, Manhattan borough, county the State of New York, have invented certain new and useful Improvements in Automobile-Tires, of which the following is a clear, full, and exact description.

This invention relates to an improved automobile tire, one of the objects of which is to provide a non-puncturable resilient tire of durable construction.

The resilient member of my improved tire preferably comprises an inflatable tube, the said tube being removably retained in position and at the same time protected from injury by contact with the ground, or objects upon the ground.

It is one of the objects of my invention to keep the said tube out of contact with the ground, but at the same time to arrange the tire, as a whole, in such a manner as to cause the tube to take the weight of the machine, whereby the resilient, or cushioning effect derived from the air within the tube is maintained.

As a tread, for the tire, I preferably employ a metal ring, which is adapted to pass around the tube. Between the ring, or tread, and the tube I interpose a filler, preferably of wood, although any other material may be used. I prefer to use wood, however, for the reason that it in itself is more or less a cushion.

My improved tire is arranged, as will hereinafter appear, to preclude, to a large extent, the sudden swerving of the machine should a tube become suddenly deflated through any cause whatsoever.

Owing to the protection of the tube, also owing to the fact that the tube does not touch the ground, the deflation thereof through bursting by impact, or leakage by puncture, is largely obviated.

Another feature of my improved tire is the fact that the tread of the wheel, at all times, presents a curved surface to the ground, even though the tube becomes deflated. With the usual pneumatic tire the tread thereof is more or less flattened at the point of contact with the ground.

My improved tire is retained in position by grooved rings, which may or may not be resilient, the said rings being secured to the felly, or rim of the wheel.

I will now proceed to describe my invention, the novel features of which I will finally claim, reference being had to the accompanying drawing, forming part hereof, wherein—

Figure 1 illustrates a side view of a wheel having secured thereto my improved tire, the cover of which is shown as broken away to reveal some of the details of construction; Fig. 2 is an enlarged cross sectional view taken on a line *a—a* in Fig. 1; Fig. 3 is an enlarged fragmentary view of a wheel and shows a modified form of securing means for the tire; Fig. 4 is a sectional detail view similar to Fig. 2, and shows one way of securing the tube and filling piece together; and Fig. 5 is a longitudinal sectional view taken on a line *b—b* in Fig. 4.

Referring to the drawing, 1 indicates a wheel equipped with my improved tire which is indicated in a general way by 2.

Referring now to the detailed description of my improved tire, 3 indicates a pneumatic, or inflatable tube, which rests in contact with the rim 4 of the wheel. To hold the tire 3 in position, I have in this instance employed the grooved rings 5 and 6. The grooved rings 5 and 6 pass completely around the wheel 1, as shown in Fig. 1; in other words the rings 5 and 6 are independent intergral structures, and are secured to the rim 4 of the wheel in this instance, by means of bolts 7. The rim 4 of the wheel is preferably recessed as at 8 to receive a projection 9, upon the tube 3, whereby the said tube is prevented from rotating. As can be seen in Fig. 2, the tube 3 is adapted to snugly fit the grooves 10 in the rings 5 and 6. The tube 3 has in contact therewith a filler 11. The filler 11 is preferably made out of wood, and is in the form of an integral ring which passes completely around the tube 3. As is obvious from the illustration, Fig. 2, the filler 11 is positioned centrally of the tube 3, in other words, the filler 11 is positioned in alinement with the rim 4 of the wheel so that the strain which is transmitted from the tread of the wheel, by the tube 3 will come directly upon the spokes 12, thence to the hub 13.

As the filler 11, in itself would in some cases make a somewhat undesirable tread, I prefer to encompass the same by a channeled ring, the portion 14 of which constitutes the tread for the wheel, and the sides 15 of which protect as well as retain the filler 11. The tread 14 of the said ring extends somewhat beyond the sides 15 as indicated by 16. The said extensions are for a purpose to be hereinafter described. The outer ends of the rings 5 and 6 terminate in flanges 17 and 18 respectively, and between the said flanges the sides 15 of the tread ring are adapted to fit and move vertically.

To prevent the rings 5 and 6 from spreading, especially should the wheels skid, I connect the flanges 17 and 18 thereof by a bolt 20, the said bolt passing through slots 21 and 22 in the sides 15 and filler 11 respectively.

As it might be necessary to protect the working parts, of my improved tire, from dust, I employ a dust guard or cover 23, which may be made out of leather, rubber, canvas, or other material. To secure the dust guard in position, I lace the same, by means of laces 24, to projecting rings 25 carried by the rings 5 and 6. The tube 3 is provided with the usual valve nipple for the purpose of introducing air therein.

It is quite obvious that the weight of the vehicle is transmitted to the wheel proper through the tube 3, which constitutes an air cushion. A resilient or cushioning effect is also transmitted to the vehicle through the give of the said tube when under pressure.

It is obvious from the construction of my improved tire that the filler 11 transmits strain to the tube 3, and in order that a cushioning effect shall result it is necessary that the tread ring and filler 11 carried thereby should be movably mounted in the rings 5 and 6. As the machine travels along, the filler 11 and tread ring will be subjected to a vertical movement due to the natural vertical movement of the machine, or more strictly speaking the said filler and tread ring will remain stationary as far as vertical movement is concerned and the rings 5 and 6, wheel 1 and the rest of the machine will move up and down. The vertical movement of the machine and appurtenances will be cushioned by the tube 3, the said tube 3 acting as an ordinary pneumatic tire, excepting for the fact that it does not contact with the ground. For the reason that the tube 3 does not contact with the ground, I lengthen its life and lessen the dangers of rupture, the whole strain of traction and wear coming upon the tread 14, and in the event of the dust guard 23 being used, the tread of the said dust-guard will take the wear.

Should the tube 3, for any reason, become suddenly deflated, the wheel 1 would suddenly lower and if a provision were not made the machine would swerve. To prevent the machine from swerving to a dangerous degree is the function of the projections 16 of the tread 14. By referring to Fig. 2 it will be seen that a space 26, when the tube 3 is inflated, is provided; this space allows for the come and go of the wheel. Should the tube 3 become deflated, the wheel will only let down to the extent of the space 26, whereby the amount that a wheel can let down is predetermined by the extent of the space 26; the extensions 16 are, therefore, for the purpose of preventing the wheel from letting down to a dangerous degree. To inflate the tube 3 I employ the usual valve 26$^a$.

By referring to the modification Fig. 3 it will be seen that the devices, which hold the tube 3 in position, are composed of independent sections 27, the said sections being resilient and secured to the rim of the wheel by bolts 28. It will also be seen in Fig. 3 that with this form of clamp I do not tie the outer flanges 29 thereof together, as this form of clamp is intended for light vehicles, for which a certain amount of resiliency on the part of the said clamp might be desirable, especially when the machine skids.

To prevent dust from passing down between the sides 15 of the tread ring, and flanges 17 and 18, I provide fiber sections 30, which are adapted to bear against the said sides 15. The fiber sections 30 are inserted in the flanges 17 and 18 as shown in Fig. 1.

To prevent the tube 3 from slipping on the filler 11 I may cement the said tube and said filler together, or I may provide the tube 3 with projections 31, which are adapted to enter recesses 32 in the inner surface of the filler 11, (see Figs. 4 and 5).

It will be seen by the foregoing description, and drawing, that the tube, which forms part of my invention, is completely inclosed by means of the grooved rings, the filler and tread thereupon; a portion of the inclosing means (the filler and tread thereupon) being inwardly movable. By inclosing the tube, as above described, the said tube is entirely protected from injury and is practically non-puncturable.

Having now described my invention, what I claim and desire to secure by Letters Patent is:

A tire adapted for attachment to the rim of a wheel, comprising a cushioning device, a channeled ring, surrounding said cushioning device but out of contact therewith, a filler carried by said channeled ring adapted to contact with said cushioning device, grooved rings embracing and supporting said cushioning device, flanges carried by said rings adapted to support said channeled ring, and sections of fibrous material carried by said flanges adapted to contact with said channeled ring, and a tread carried by said ring.

Signed at New York city, N. Y., this 24th day of August, 1908.

WILLIAM J. BAUER.

Witnesses:
EDWARD A. JARVIS,
ABRAM SHLIVEK.